Patented Oct. 23, 1934

1,978,070

UNITED STATES PATENT OFFICE 1,978,070

NITROCELLULOSE COMPOSITION AND PROCESS OF PREPARING SAME

Albert Foster York, Washington, D. C., assignor to S. Sternau & Co., Inc., New York, N. Y., a corporation of New York No Drawing. Application February 25, 1932, Serial No. 595,233

9 Claims. (Cl. 52—20)

This invention relates to nitrocellulose compositions such as explosives and processes of producing the same.

During the process of manufacture of explosives, plastics, and many other materials, it is necessary that the nitrocellulose be "colloided", a term used in the art to designate a treatment with solvents to remove structure and convert the nitrocellulose into an amorphous integral body. The solvents may be used in a quantity sufficient to make a solution or in an amount merely sufficient to plasticize.

The base material of one such known explosive is nitrocellulose of relatively high nitrogen content as contrasted with the collodion nitrocellulose of lower nitrogen content. A highly nitrated nitrocellulose may contain as high as 13.7% nitrogen whereas a collodion nitrocellulose contains approximately from 10–12.5% nitrogen.

The collodion type nitrocellulose is readily colloided by anhydrous ethyl alcohol and by methyl alcohol at room temperature and above, while on the contrary the highly nitrated type nitrocellulose cannot ordinarily be colloided by anhydrous ethyl alcohol or methyl alcohol but must be colloided by such solvents as acetone, for the solvent action of anhydrous ethyl alcohol, methyl alcohol, and even of ether-alcohol on this type of nitrocellulose is normally very slight and for the higher nitrogen ranges is practically nil.

This invention is based on the scientific discovery made by the applicant that methyl alcohol will colloid highly nitrated nitrocellulose 12.5–13.7% $N_2$ at sub-zero temperatures. Other alcohols, as propyl, butyl and the higher aliphatic monohydroxy alcohols, do not colloid any type nitrocellulose at temperatures from room temperature down to that obtained by solid carbon dioxide. However, by the use of sub-zero cold combined with pressure in the cold, it is possible to get such improved colloiding and such decreased time of colloiding that methyl alcohol may be used in the manufacture of smokeless powder. Such use of pressure, although advisable, is not absolutely necessary. The dissolving and gelling of collodion types of nitrocellulose in methyl alcohol, ethyl alcohol, anhydrous and aqueous, is described with examples in the patent to Jones and York 1,934,860, which relates more specifically to the manufacture of solidified alcohol fuels.

The application to the manufacture of smokeless powder of the methods of colloiding highly nitrated nitrocellulose in methyl gives many advantages over the prior art. The elimination of ether or acetone simplifies the process of manufacturing and lessens a fire hazard due to these materials. The substitution of methyl alcohol for the ether or acetone remaining in the final product improves the product in that there is a reduced tendency toward carbon deposition due to the reduction in the proportion of the carbon to oxygen. This holds true, but to a lesser degree where the ether or acetone is only partially replaced by alcohol i. e. where methyl alcohol-ether, methyl alcohol-acetone, are used in the low temperature process. Other solvents and liquids mixable in alcohol may be used. Other advantages of the process will become apparent on reading the specification.

Methyl alcohol has advantages over ethyl alcohol in addition to its superior colloiding ability. Its lower boiling point is of advantage in evaporation and drying. The fact that it does not form a constant boiling mix with water as does ethyl alcohol is of advantage in solvent recovery and reuse of the alcohol. It burns with a flame which has less unburned carbon than any known solvent used in the manufacture of these explosives. Furthermore, the development of synthetic processes has made available large quantities of inexpensive pure anhydrous methyl alcohol or synthetic methanol. The expense, purity and water free state of the solvent used in the manufacture of smokeless powder is of great importance.

The steps in the manufacture of my smokeless powder are dehydrating, cooling, colloiding, forming and drying.

The dehydration of water wet nitrocellulose as done by prior methods at present is to displace the water with 95% ethyl alcohol. In my low temperature process, the procedure is to displace the water with methyl alcohol recovering the methyl alcohol from the resulting aqueous methyl alcohol in a simple distillation. However, if ethyl alcohol is to be used as the colloiding agent the 95% ethyl alcohol followed by anhydrous ethyl alcohol is used to displace the water and obtain an alcohol wet nitrocellulose.

After dehydration of the nitrocellulose comes the colloiding stage. In the low temperature process a typical procedure is as follows: methyl alcohol wet nitrocellulose is subjected in a closed apparatus to a temperature of around —20° C. At low concentrations of nitrocellulose in methyl alcohol colloiding results of itself, at medium concentrations mixing by kneading is advisable, while at very high concentrations, i. e., where the amount of alcohol is just about sufficient only to wet the nitrocellulose viz. 75% nitrocellulose, 25% alcohol, it is advisable to use pressure to bring about colloiding. All, or part of the pressure may be obtained by allowing the cold mass to warm and expand against retaining means. This is an important step possible only in the low temperature process. Also the first compression may be supplemented by mixing and recompression. After the colloiding process, the material is pressed or formed by dies into grains of the required size and shape. All of the stages may be carried out in the cold or some at room temperature, but it is advisable that at least part of the pressure is exerted on the cold mixture. The formed material is dried to a given dimension, the finished material having only a slight solvent content.

Another method is as follows: a substantially water free mixture of nitrocellulose and methyl alcohol in about the proportion of 1—1, is subjected to low temperatures of about $-30°$ C. The temperatures used may vary, the best colloiding action with a given amount of solvent being obtained at low temperatures such as $-80°$ C. The cold mixture is then kneaded and thoroughly mixed so as to bring about good colloiding of the nitrocellulose by the methyl alcohol. The mass is then run through rollers which transform it into thin homogeneous and transparent sheets. The sheets can easily be cut into strips in a cutting machine and these strips further cut into square leaflets or flakes. Instead of using rollers, the kneaded mass may be run into a pressing machine, the mouth of which is so formed that the sheets come out as strips of the proper width, and these may be cut into squares. The rolling or pressing operations may be carried out wholly or partially on the cold mass or sol. If the sol is allowed to rise to room temperatures it sets to a gel. This gel mass may also be rolled or pressed and in this operation part of the solvent may be squeezed out and separated. However, in all events, a final drying stage is necessary for the last few per cent of methyl alcohol is removed with extreme difficulty and cannot be completely removed.

It is to be understood that not only may methyl alcohol be used in the low temperature colloiding but also there may be used methyl alcohol-ethyl alcohol, and mixtures with methyl alcohol of ether and/or acetone, and other common solvents. It is also to be understood that materials commonly used in the manufacture of smokeless powder such as diphenyl amine may be mixed with the alcohol.

It is to be further understood that the temperatures used may vary from low enough to freeze the solvents to temperatures slightly below room temperature. Since the colloiding ability of methyl alcohol increases with decreasing temperature, in order to use as little alcohol as possible, it is advisable to colloid at sub-zero temperatures. However, some colloiding is possible at slightly below room temperature and results may be obtained at such temperatures especially if ether or acetone is used with the alcohol. In general low temperatures obtained by an ammonia refrigeration are satisfactory although carbon dioxide refrigeration to obtain very low temperatures is practical and advantageous.

It is to be understood that this invention is not limited to the specific examples given. Various combinations by rearrangements of the steps in the processes are apparent. The various processes may be used to produce fuels, plastics, and many other products as well as explosives.

What I claim is:—

1. The process of producing a nitrocellulose composition which comprises colloiding highly nitrated nitrocellulose normally insoluble in ether-alcohol by methyl alcohol with the aid of temperatures below zero degrees centigrade.

2. The process of producing a nitrocellulose explosive composition which comprises colloiding highly nitrated nitrocellulose normally insoluble in ether-alcohol by methyl alcohol with the aid of temperatures below $0°$ C., and evaporating off the excess alcohol.

3. The process of producing a nitrocellulose composition which comprises subjecting highly nitrated nitrocellulose normally insoluble in ether-alcohol nitrocellulose and methyl alcohol to a temperature below $0°$ centigrade, and allowing the cold mixture to expand against retaining means.

4. A nitrocellulose composition which comprises highly nitrated nitrocellulose normally insoluble in ether-alcohol, and a residue containing no other solvent than methyl alcohol.

5. The process of producing a nitrocellulose composition which comprises colloiding nitrocellulose normally insoluble in ether-alcohol using methyl alcohol and a temperature from zero degrees C. to the freezing point of the mixture.

6. The process of producing a nitrocellulose composition which comprises colloiding nitrocellulose of a type which is normally insoluble in ether-alcohol using methyl alcohol and a temperature of the order of $-30$ degrees C.

7. The process of producing a nitrocellulose composition which comprises colloiding nitrocellulose normally insoluble in ether-alcohol using methyl alcohol and temperatures of the order of $-80$ degrees centigrade.

8. A composition comprising nitrocellulose of a type which is in the range of solubility in ether-alcohol from slightly to practically nil at normal atmospheric temperature and pressure, and a solvent for said nitrocellulose consisting of methyl alcohol.

9. A composition comprising nitrocellulose of a nitrogen content of approximately 13%, and a solvent for said nitrocellulose consisting of methyl alcohol.

ALBERT FOSTER YORK.